US008506117B2

(12) United States Patent
Hung et al.

(10) Patent No.: US 8,506,117 B2

(45) Date of Patent: Aug. 13, 2013

(54) LED ILLUMINATION DEVICE HAVING REFLECTOR FOR PRODUCING REQUIRED LIGHT PATTERN

(75) Inventors: Pei-Yuan Hung, Miao-Li Hsien (TW); Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 541 days.

(21) Appl. No.: 12/721,522

(22) Filed: Mar. 10, 2010

(65) Prior Publication Data

US 2011/0157886 A1 Jun. 30, 2011

(30) Foreign Application Priority Data

Dec. 29, 2009 (CN) .......................... 2009 1 0312536

(51) Int. Cl.
*B60Q 1/26* (2006.01)

(52) U.S. Cl.
USPC ............ 362/235; 362/227; 362/247; 362/341

(58) Field of Classification Search
USPC ................. 362/235, 227, 247, 341; 313/113; 349/113
See application file for complete search history.

(56) References Cited

U.S. PATENT DOCUMENTS

| | | | | |
|---|---|---|---|---|
| 6,045,238 | A * | 4/2000 | Wheeler et al. | 362/247 |
| 6,200,002 | B1 * | 3/2001 | Marshall et al. | 362/231 |
| 7,621,654 | B2 * | 11/2009 | Nishimoto et al. | 362/241 |
| 7,695,180 | B2 * | 4/2010 | Schardt et al. | 362/625 |
| 8,042,968 | B2 * | 10/2011 | Boyer et al. | 362/235 |
| 2002/0080622 | A1 * | 6/2002 | Pashley et al. | 362/555 |
| 2009/0180299 | A1 | 7/2009 | Ito et al. | |
| 2009/0201677 | A1 * | 8/2009 | Hoelen et al. | 362/231 |
| 2011/0019404 | A1 * | 1/2011 | Chien et al. | 362/235 |

FOREIGN PATENT DOCUMENTS

| | | | |
|---|---|---|---|
| CN | 1404564 | A | 3/2003 |
| CN | 1693962 | A | 11/2005 |
| CN | 101963326 | A | 2/2011 |
| JP | 2009170188 | A | 7/2009 |

* cited by examiner

*Primary Examiner* — Jong-Suk (James) Lee
*Assistant Examiner* — Mark Tsidulko
(74) *Attorney, Agent, or Firm* — Altis Law Group, Inc.

(57) ABSTRACT

An LED illumination device includes a polygonal reflector and a plurality of LEDs received in the reflector. The reflector includes multiple sidewalls connecting with each other. Each LED is located adjacent to at least one corresponding neighboring sidewall. The polygonal reflector can have a shape of a square, a rectangle, an octagon etc. Light generated by the LEDs has at least a part reflected by the reflector to radiate out of the LED illumination device upwardly. The LED is a top view LED. A top of an LED die of the LED is no higher than a bottom of the sidewalls of the reflector.

17 Claims, 11 Drawing Sheets

LED ILLUMINATION DEVICE HAVING REFLECTOR FOR PRODUCING REQUIRED LIGHT PATTERN

BACKGROUND

1. Technical Field

The present disclosure relates to illumination devices and, more particularly, to an LED illumination device having a reflector capable of producing a circular or square light pattern.

2. Description of Related Art

LEDs, available since the early 1960's and because of their high light-emitting efficiency, have been increasingly used. According to Illuminating Engineering Society of North America (IESNA), illumination distribution of lighting used in some occasions, such as squares, sidewalks, yards, parks, or parking lots must meet the standards of Type IV or Type V. These two types of standard require that the light illuminating on the site has a circular or square pattern, in which the light source is located at a center of the pattern. However, the light directly emitted from the LEDs usually cannot meet such a requirement. To meet the requirement, a lens which can modulate the light distribution of the LEDs may be used. However, the lens is expensive and when light travels through the lens the intensity of the light is significantly reduced. A reflector is cheaper than a lens and the light intensity will not be significantly reduced when the light is reflected by a reflector.

What is needed, therefore, is an illumination device having a reflector which can modulate the light generated by the illumination device so that the light pattern can meet the standards of IESNA Type VI and Type V.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
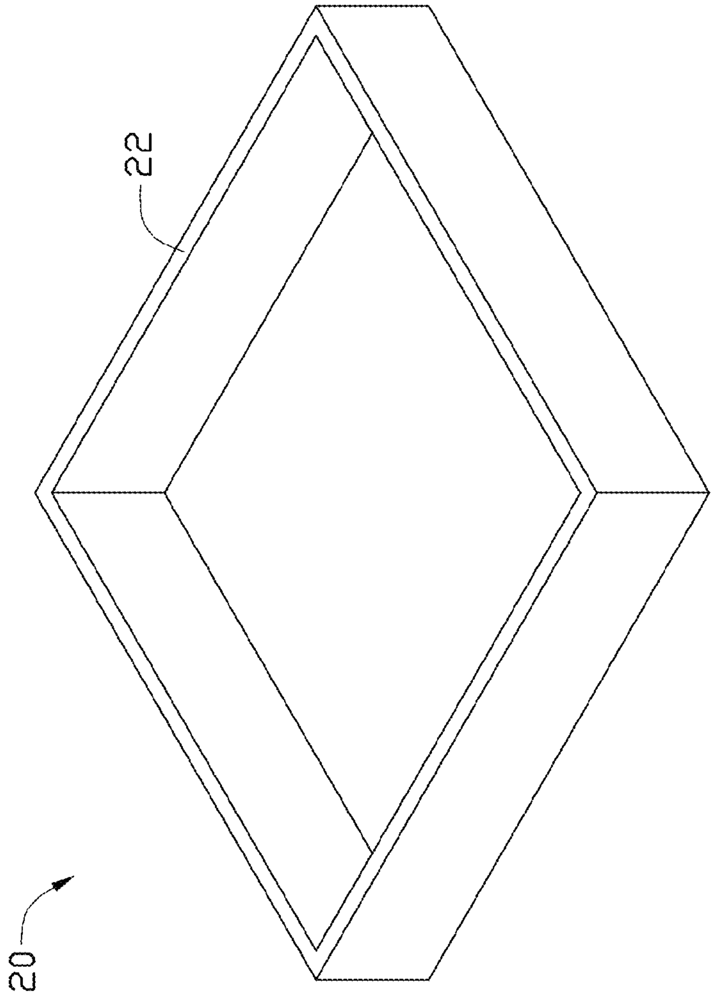
FIG. 1 is an isometric view of a reflector of an LED illumination device of a first embodiment of the present disclosure.
Figure 2:
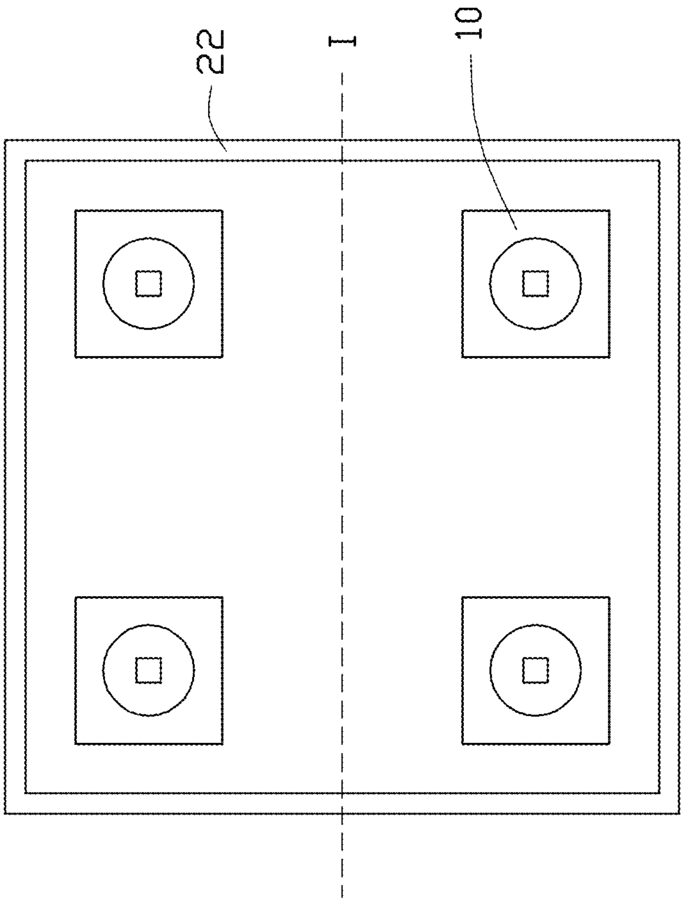
FIG. 2 is a top view of the LED illumination device of FIG. 1, including the reflector of FIG. 1 and four LEDs placed within the reflector.
Figure 3:
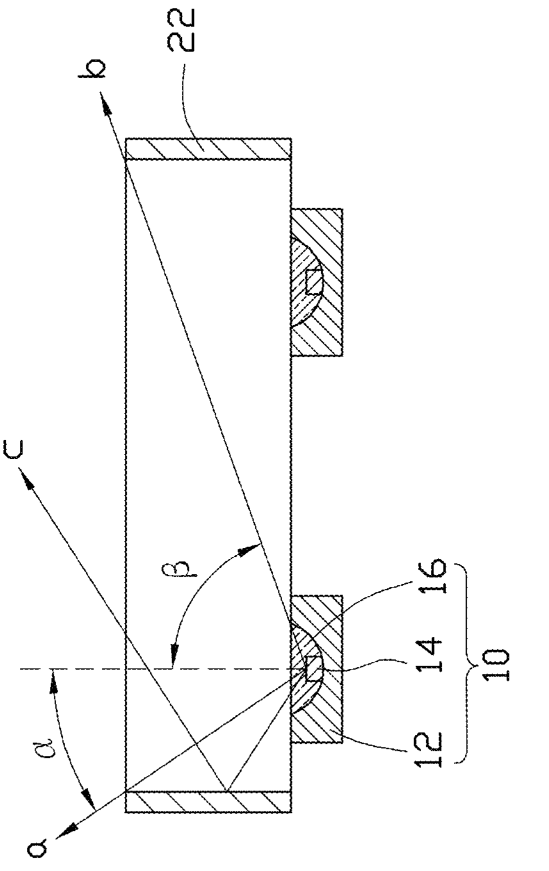
FIG. 3 shows a cross-section of the reflector with the four LEDs of FIG. 2.

Referring to FIGS. 1-2, an LED illumination device of a first embodiment of the present disclosure is disclosed. The LED illumination device includes a reflector 20 and four LEDs 10 received in the reflector 20. The reflector 20 has a square configuration constructed by four vertical sidewalls 22. A symmetrical axis I is defined in the reflector 20 to divide the reflector 20 into two symmetrical parts. Left and right sidewalls 22 of the reflector 20 each define a zero angle with respect to the symmetrical axis I; in other words, the left and right sidewalls 22 are parallel to the symmetrical axis I. Front and rear sidewalls 22 of the reflector 20 each define an angle of 90 degrees with respect to the symmetrical axis I. In other words, the front and rear sidewalls 22 are perpendicular to the symmetrical axis I. Each LED 10 is located near a corner of the reflector 20. Referring to FIG. 3, a guidance of the reflector 20 to the light emitted from an exemplary LED 10 located at a left and rear corner of the reflector 20 is illustrated. A first part of the light emitted from the LED 10 (such as light a shown in FIG. 3), which is oriented towards a left direction with an emergent angle less than or equal to a critical angle $\alpha$, would directly radiate out of the reflector 20 towards the left side of the reflector 20. A second part of light emitted from the LED 10 (such as light c shown in FIG. 3), which is oriented towards the left direction with an emergent angle larger than the critical angle of $\alpha$, would be reflected by the adjacent left sidewall 22 towards the right side of the reflector 20. A third part of light emitted from the LED 10 (such as light b shown in FIG. 3), which is oriented towards the right direction with an emergent angle less than or equal to another critical angle of $\beta$, would directly transmit out of the reflector 20 towards the right side of the reflector 20. A forth part of light emitted from the LED 10, which is oriented towards the right direction with an emergent angle larger than the critical angle of $\beta$, would be reflected by the right sidewall 22 towards the left side of the reflector 20. Since the critical angle of $\beta$ is larger than the critical angle of $\alpha$, an amount of the output light towards the right direction is larger than that towards the left direction (i.e., intensity of the first part of light plus the forth part of light being smaller that of the second part of light plus the third part of light). Therefore, the light emitted by the exemplary LED 10 is mainly guided by the reflector 20 towards the right direction. On the other hand, since the exemplary LED 10 is also located near the rear sidewall, the light emitted thereby would be mainly guided by the reflector 20 towards a front direction as well. Light emitted from the other three LEDs 10 is also guided by the reflector 20 in a manner similar to that of the exemplary LED 10. The light directed by the reflector 20 from the four LEDs 10 overlaps with each other, to thereby form a symmetrically distributed light pattern, which is approximately square.

Furthermore, each sidewall 22 of the reflector 20 can has its upper portion curvedly extending inwardly to enlarge an illumination area of the LED illumination device. Alternatively, the reflector 20 can only have two opposite sidewalls 22 or one sidewall 22 curved inwardly to just broaden the illumination at a corresponding direction.

Figure 4:
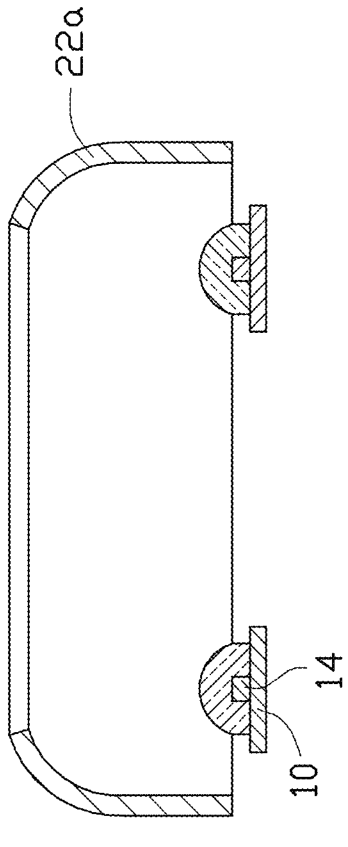
FIG. 4 is similar to FIG. 3, wherein two opposite sidewalls of the reflector are curved inwardly.

The LED 10 has a flat light-emergent face in a top thereof. The LED 10 shown in FIG. 3 includes a base 12 defining a cavity, an LED die 14 fixed in the base 12, and an encapsulant 16 filling the cavity to form the flat light-emergent face in the top of the LED 10. For such a top-view LED which has a flat light-emergent face, the LED 10 should be placed within the reflector 20 in a manner that the light-emergent face thereof levels with a bottom of the reflector 20 with the encapsulant 16 substantially located below the reflector 20, thereby ensuring the light output from the light-emergent face to be effectively reflected by the reflector 20. Alternatively, for another LED 10 which has a non-planar light-emergent face (such as the LED 10 shown in FIG. 4, the encapsulant 16 thereof being protruded upwardly to have an arced light-emergent face), the LED 10 should be placed within the reflector 20 in a manner that a top face of the LED die 14 flushes with the bottom of the reflector 20 with a top part of the encapsulant 16 being located in the reflector 20. FIG. 4 shows an alternative embodiment, wherein two opposite walls 22*a* of the reflector 20 are curved inwardly toward each other and toward the LEDs 10. In particular upper portions of the two opposite walls 22*a* are bent toward each other and toward the LEDs 10.

Figure 5:
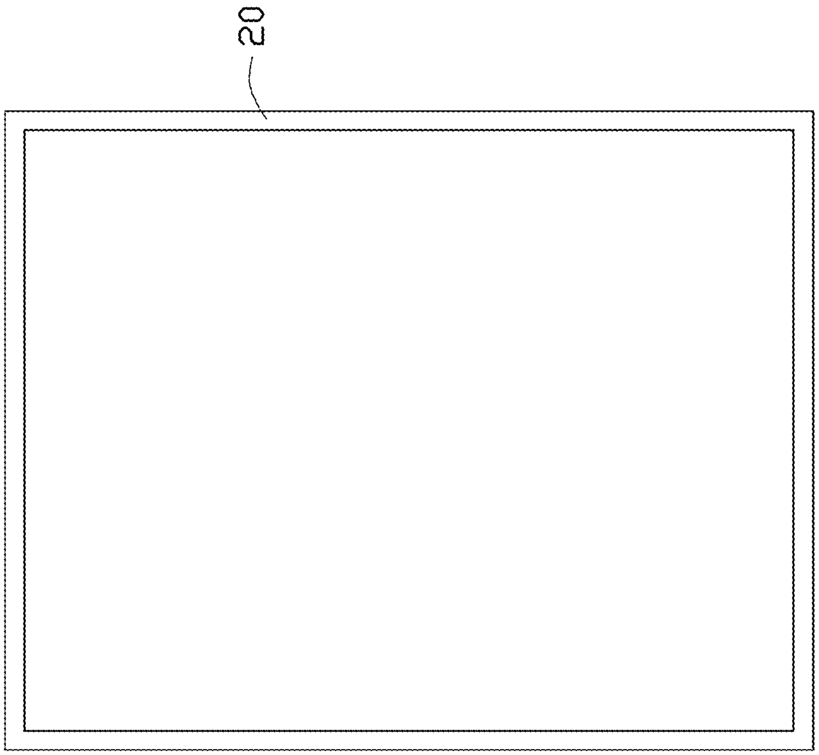
FIG. 5 shows the reflector of FIG. 1 stretched along a direction.

It is noted that the shape of the reflector 20 is not limited to the square as described above, but can include other polygons, such as rectangle shown in FIG. 5 and octagons shown in FIGS. 6-9. Such alternative reflectors can also function to reflect the light generated by the LEDs 10 to have the desired light distribution pattern. The octagonal reflector 30 will be described below in more details.

Figure 6:
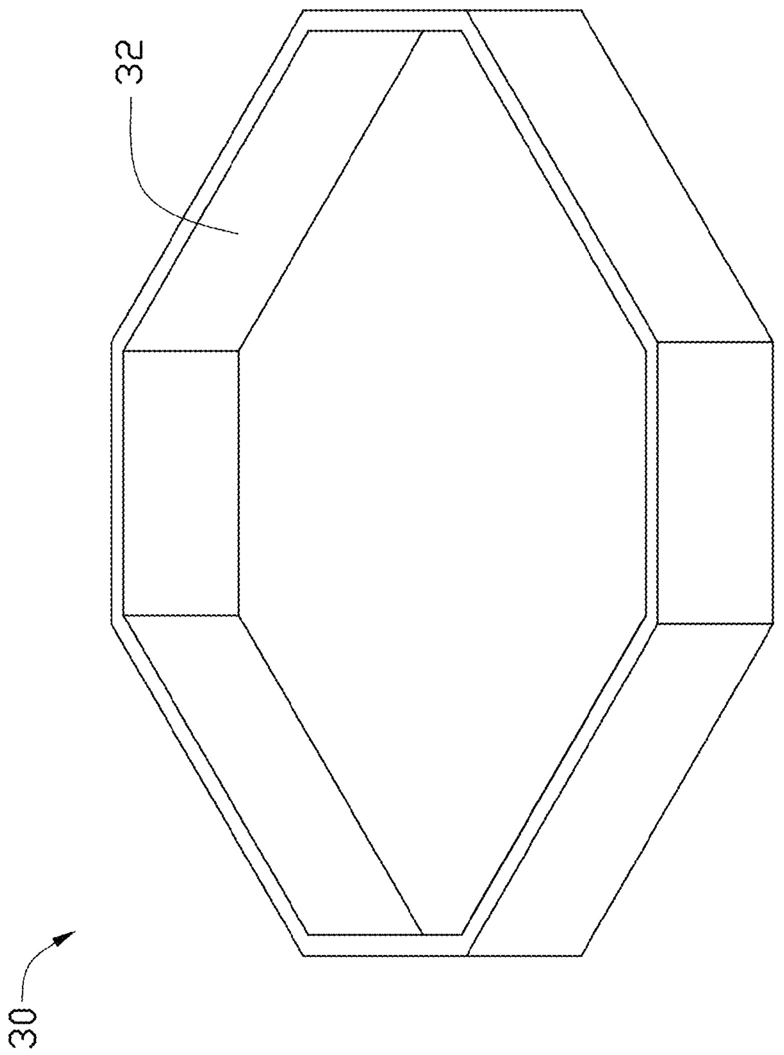
FIG. 6 is an isometric view of a reflector of an LED illumination device of a second embodiment of the present disclosure.
Figure 7:
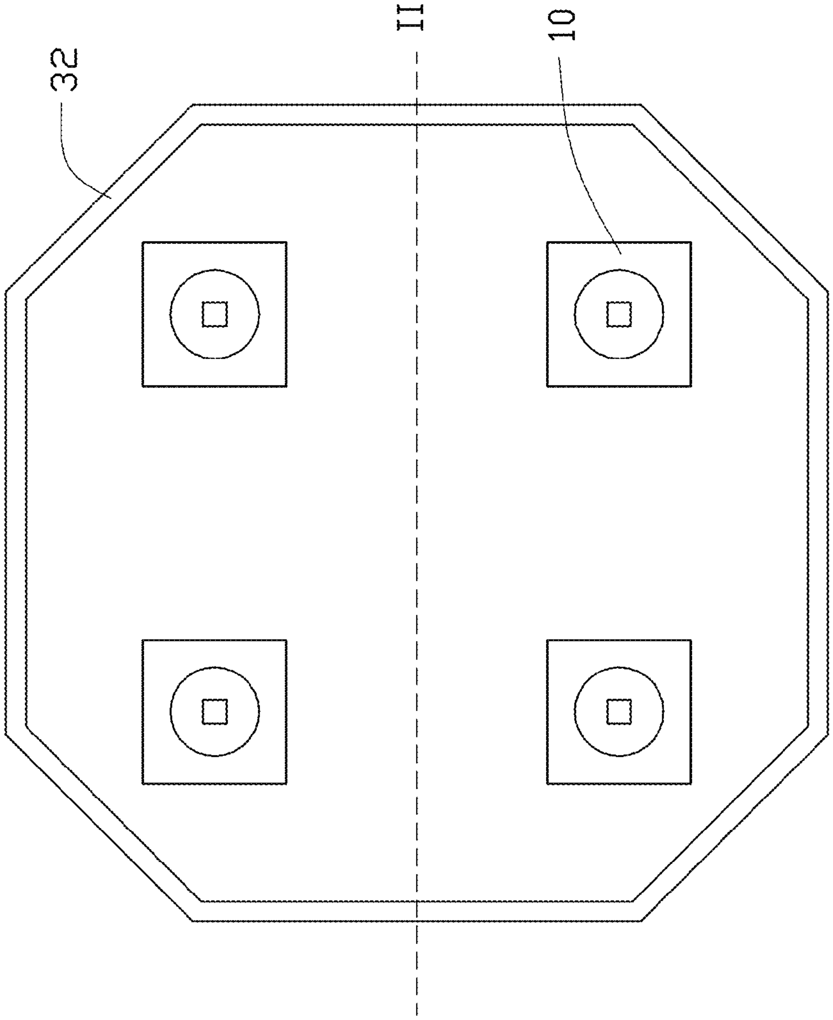
FIG. 7 is a top view of the LED illumination device of FIG. 6, including the reflector of FIG. 6 and four LEDs surrounded by the reflector.

Referring to FIGS. 6-7, the octagonal reflector 30 includes eight sidewalls 32 connected to each other successively to form a closed configuration. A symmetrical axis II is also introduced to the octagonal reflector 30 so that two parts of the reflector 30 divided by the axis II are symmetrical with each other. The eight sidewalls 32 of the reflector 30 define different angles from the axis II, wherein left and right sidewalls 32 each define an angle of zero degree from the axis II (i.e., parallel to the axis II), front and rear sidewalls 32 each define a 90 angle from the axis II (i.e., perpendicular to the axis II), and four diagonal sidewalls 32 each define an angle of 45 degrees from the axis II. The four LEDs 10 are received in the reflector 30 such that each LED 10 is located adjacent to a corresponding diagonal sidewall 32. Like the square reflector 20, the octagonal reflector 30 also reflects the light emitted from the four LEDs 10 to an overlapped pattern. The overlapped light pattern is a symmetrically distributed pattern which is approximately circular. Note that corresponding sidewalls 32 of the octagonal reflector 30 can also be curved inwardly to thereby broaden illumination at corresponding directions as desired.

Figure 8:
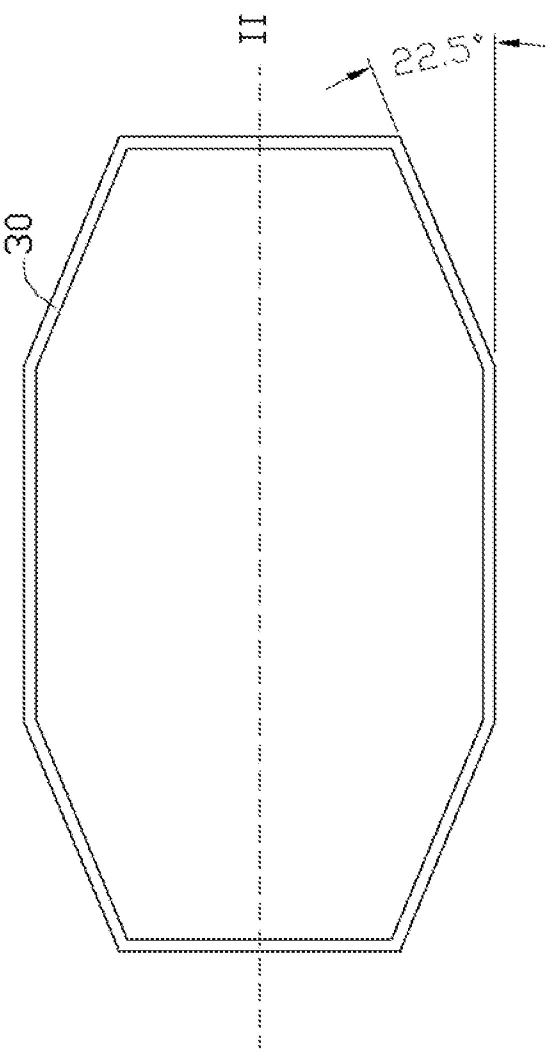
FIG. 8 shows the reflector of FIG. 6 stretched along a direction.
Figure 9:
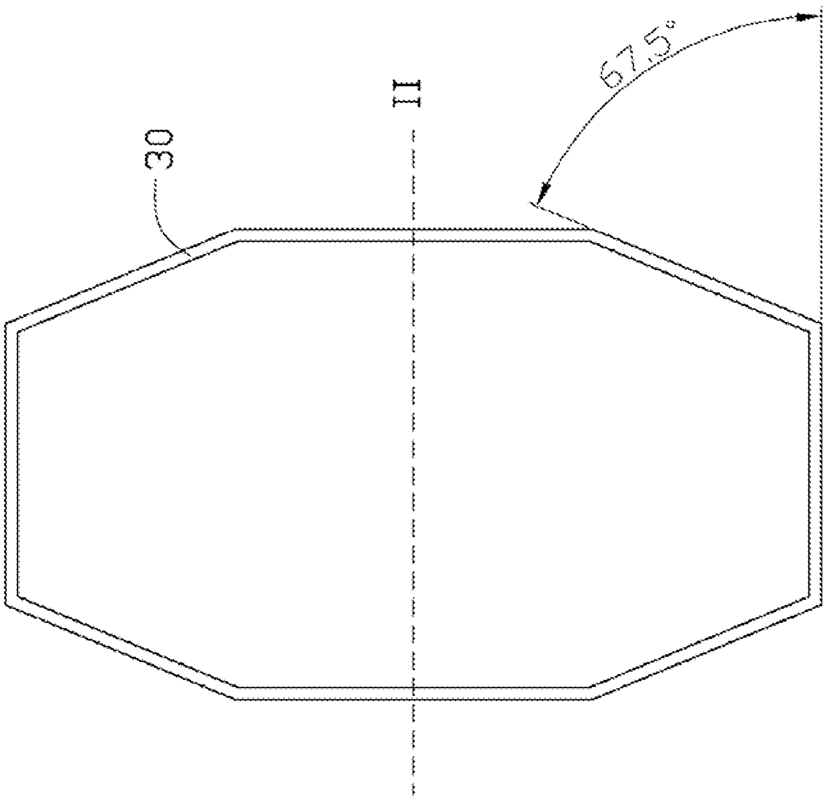
FIG. 9 shows the reflector of FIG. 6 stretched along another direction.

Furthermore, the shape of the octagonal reflector 30 can also be varied to those shown in FIGS. 8-9 according to different requirements. The reflector 30 of FIG. 8 is stretched with respect to that of FIG. 7 along the axis II, wherein the angle between each of the four diagonal sidewalls 32 and the axis II is changed to 22.5 degrees. The reflector 30 of FIG. 9 is stretched with respect to that of FIG. 7 along a direction perpendicular to the axis II, wherein the angle between each of the four diagonal sidewalls 32 and the axis II is changed to 67.5 degrees. By such variations of the shape of the reflector 30, the light distribution pattern obtained by the LEDs 10 are changed from the circle shape to two ellipses which have major axes perpendicular to each other.

Figure 10:
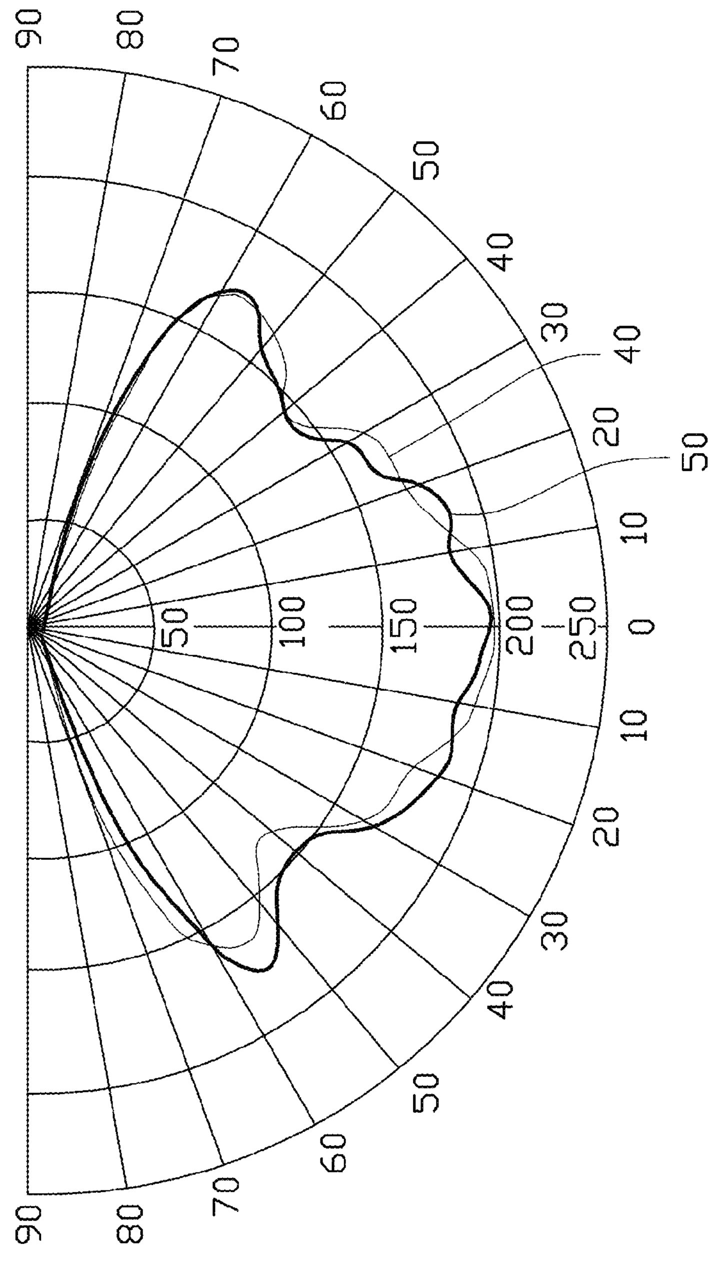
FIG. 10 shows photometric curves of an LED lamp including the LED illumination devices of the first and second embodiments arranged in a matrix.
Figure 11:
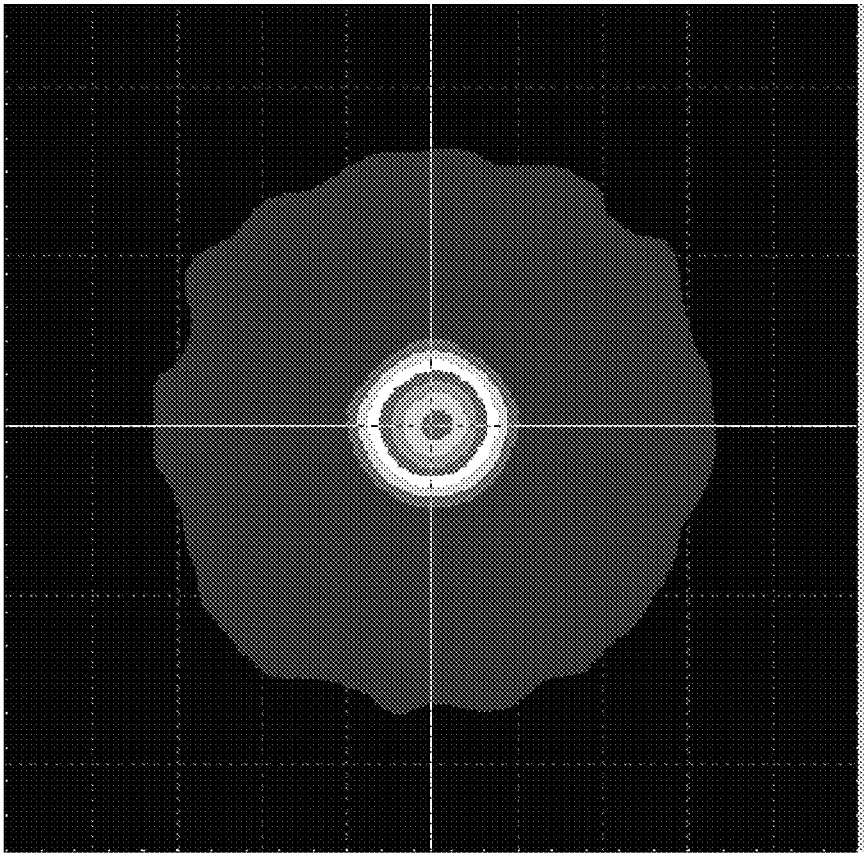
FIG. 11 shows an illumination distribution of the LED lamp of FIG. 10.

An LED lamp can have the LED illumination devices with the rectangular and the octagonal shapes arranged in a matrix to produce a more favorable light pattern. FIG. 10 which is a Candela plot shows photometric curves 40, 50 of an LED lamp having the LED illumination devices of FIG. 2 and FIG. 7 arranged in a matrix (i.e., a four-column, eight-row matrix). The two photometric curves (i.e., the bold curve 50 and the thin curve 40) have similar shapes and are substantially overlapped, representing that the distribution of the light at the two orthogonal directions are approximate to each other. Thus, the light distribution of the LED lamp can have a desirable shape approximate to a circle as shown in FIG. 11, thereby meeting the Type IV and Type V illumination requirements of IESNA.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An LED illumination device, comprising:

a polygonal reflector comprising a plurality of sidewalls; and a plurality of LEDs surrounded by the reflector, each LED being a top view LED having an LED die and an encapsulant covering the LED;

wherein each of the LEDs is located adjacent to at least one corresponding neighboring sidewall of the reflector;

wherein the LED die is located no higher than a bottom of the sidewalls of the reflector and light generated by the LED die radiates upwardly through the encapsulant to be reflected by the reflector; and wherein at least one of the sidewalls has an upper portion bent inwardly toward LEDs, the upper portion of the at least one of the sidewalls partly covers the LEDs, a part of light from the LEDs directly radiates out of the reflector through an opening beside the upper portion of the at least one of the sidewalls, another part of light from the LEDs is reflected by the sidewalls and then radiates out of the reflector through the opening beside the upper portion of the at least one of the sidewalls.

2. The LED illumination device as claimed in claim 1 the reflector is an equilateral polygon.

3. The LED illumination device as claimed in claim 2, wherein the reflector has a shape of a square.

4. The LED illumination device as claimed in claim 3, wherein each of the LEDs is located adjacent to two corresponding neighboring sidewalls of the reflector.

5. The LED illumination device as claimed in claim 2, wherein the reflector has a shape of an octagon.

6. The LED illumination device as claimed in claim 5, wherein each of the LEDs is located adjacent to a corresponding one of two opposite sidewalls of the octagon.

7. The LED illumination device as claimed in claim 1, wherein an angle of one of the sidewalls in respect to a symmetrical axis of the reflector is 22.5 degrees.

8. The LED illumination device as claimed in claim 1, wherein an angle of one of the sidewalls in respect to a symmetrical axis of the reflector is 67.5 degrees.

9. The LED illumination device as claimed in claim 1, wherein the reflector comprises two opposite sidewalls each having an upper portion thereof curved towards an inside of the reflector.

10. The LED illumination device as claimed in claim 1, wherein a top face of the encapsulant is flat and level with the bottom of the sidewalls of the reflector.

11. The LED illumination device as claimed in claim 1, wherein a top face of the encapsulant is arced, and a top face of the LED die is level with the bottom of the sidewalls of the reflector.

12. The LED illumination device as claimed in claim 11, wherein a top end of the encapsulant is located in the reflector.

13. The LED illumination device as claimed in claim 1, wherein the LEDs have a number of four.

14. An LED lamp comprising:

a plurality of LED illumination devices arranged in a matrix, each LED illumination device comprising a reflective shell in the form of a polygon and a plurality of LEDs located within the polygon, in which at least a part of light generated by the LEDs is reflected by the reflective shell to radiate out of the LED lamp, and wherein the polygon of the reflective shell of at least one of the LED illumination devices is different from that of another one of the LED illumination devices, wherein the reflective shell has an upper portion bent inwardly toward LEDs, the upper portion of the reflective shell partly covers the LEDs a s art of light from the LEDs directly radiates out of the reflective shell through an opening beside the upper portion thereof, another part of light from the LEDs is reflected by the reflective shell and then radiates out of the reflective shell through the opening beside the upper portion thereof.

15. The LED lamp of claim 14, wherein a light pattern generated by the LED lamp meets the requirement of one of Type IV and Type V standards of IESNA (Illuminating Engineering Society of North America).

16. The LED lamp of claim 15, wherein the polygon of the reflective shell of the at least one of the LED illumination devices is octagon and the polygon of the reflective shell of the another one of the LED illumination devices is square.

17. The LED lamp of claim 14, wherein the polygon of the reflective shell of the at least one of the LED illumination devices is octagon and the polygon of the reflective shell of the another one of the LED illumination devices is square.

* * * * *